US012260503B2

(12) United States Patent
Tam et al.

(10) Patent No.: US 12,260,503 B2
(45) Date of Patent: Mar. 25, 2025

(54) FACILITATING TRANSACTIONS BETWEEN USERS IN A VIRTUAL WORLD ENVIRONMENT

(71) Applicant: Honda Motor Co., Ltd., Tokyo (JP)

(72) Inventors: Tiffany Hui-Fong Tam, Palos Verdes Estates, CA (US); Christopher John Tarchala, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 17/869,664

(22) Filed: Jul. 20, 2022

(65) Prior Publication Data

US 2024/0029361 A1 Jan. 25, 2024

(51) Int. Cl.
*G06T 19/00* (2011.01)
*G06F 3/04815* (2022.01)
*G06Q 30/0601* (2023.01)
*G06T 15/00* (2011.01)

(52) U.S. Cl.
CPC ........ *G06T 19/003* (2013.01); *G06F 3/04815* (2013.01); *G06Q 30/0641* (2013.01); *G06T 15/005* (2013.01)

(58) Field of Classification Search
CPC ... G06T 19/003; G06T 15/005; G06T 15/006; G06F 3/04815; G06F 3/04842; G06Q 30/0641; G06Q 30/0643
See application file for complete search history.

(56) References Cited

U.S. PATENT DOCUMENTS

| | | | | |
|---|---|---|---|---|
| 10,902,496 | B2* | 1/2021 | Narasimhan | G06F 16/2452 |
| 11,049,176 | B1* | 6/2021 | Drynan | G06V 20/00 |
| 11,924,283 | B2* | 3/2024 | Berliner | H04L 63/102 |
| 2015/0248719 | A1* | 9/2015 | Hansen | G06Q 30/0627 |
| | | | | 705/26.63 |
| 2018/0150903 | A1* | 5/2018 | Waldron | G06F 3/011 |
| 2018/0247370 | A1* | 8/2018 | Nickerson | G06Q 20/202 |
| 2018/0350144 | A1* | 12/2018 | Rathod | G06Q 20/3224 |
| 2019/0108578 | A1* | 4/2019 | Spivack | G09B 5/065 |
| 2019/0108686 | A1* | 4/2019 | Spivack | G06Q 30/0277 |
| 2021/0201029 | A1* | 7/2021 | Ju | G06Q 30/0185 |

(Continued)

FOREIGN PATENT DOCUMENTS

| | | | | | |
|---|---|---|---|---|---|
| CA | 3121009 | A1 * | 5/2019 | | G06F 3/011 |
| CN | 102201099 | A * | 9/2011 | | G06F 3/017 |

(Continued)

*Primary Examiner* — Chante E Harrison
(74) *Attorney, Agent, or Firm* — Joslyn Elena Garcia; American Honda Motor Co., Inc.

(57) ABSTRACT

An electronic device and method for rendering a virtual world for facilitating transactions between users is provided. The electronic device controls a display device to render a virtual world with a set of virtual elements to represent a set of real-world locations of a geographical area. The electronic device selects a virtual element from the set of virtual elements and further controls the display device based on the selection to render a set of objects inside the virtual world. The set of objects represents a set of offerings that is transactable and available with a seller associated the selected virtual element. The electronic device receives a selection of an object of the set of objects and executes, for the object in the received selection, a transaction between the seller and a customer associated with the electronic device.

20 Claims, 10 Drawing Sheets

(56) References Cited

U.S. PATENT DOCUMENTS

2021/0350437 A1    11/2021  Gulati et al.
2022/0374969 A1*  11/2022  Berger .................. G06V 20/10

FOREIGN PATENT DOCUMENTS

| | | | | |
|---|---|---|---|---|
| DE | 102010051636 | A1 | 6/2011 | |
| DE | 112022001036 | T5 * | 12/2023 | ........... G06T 19/006 |
| EP | 3174240 | A4 | 6/2018 | |
| IN | 2027/MUM/2011 | A | 1/2013 | |
| KR | 101272232 | B1 | 6/2013 | |
| KR | 20140123934 | A | 10/2014 | |
| KR | 20150100972 | A | 9/2015 | |
| KR | 101693631 | B1 * | 1/2017 | |
| KR | 20210050439 | A * | 5/2021 | |
| KR | 102595000 | B1 * | 10/2023 | |
| KR | 20230155768 | A * | 11/2023 | |
| RU | 2622854 | C1 | 6/2017 | |
| WO | WO-2019099912 | A1 * | 5/2019 | .............. G06F 3/011 |

\* cited by examiner

FACILITATING TRANSACTIONS BETWEEN USERS IN A VIRTUAL WORLD ENVIRONMENT

BACKGROUND

Advancements in digital commerce have led to the development of applications that allow users to perform transactions (such as sell, purchase, rent, or resell) for products and services via platforms such as e-commerce, classified advertisements, or T-commerce. For example, an e-commerce website may provide a platform for consumer-to-consumer and business-to-consumer sales. If a customer is interested in a product, then the customer may view information (such as pricing information, reviews, or seller) associated with the product and may decide to purchase the product or avail the product on rent based on the information provided on the platform. In some instances, a customer may be interested in buying or renting items that are up for sale or rent in the neighborhood. For example, there may be neighbors or people living in the same block who may be interested in renting or selling/reselling products or services to trustworthy people in the local neighborhood. Ecommerce or classified advertisement platforms may lack features that may enable a customer to look for and buy products or services from people in the local neighborhood. Similarly, such platforms may lack features that may enable a seller to sell products or services to people in the local neighborhood.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device configured to render a virtual world for facilitating transactions between users in a neighborhood is provided. The electronic device may include circuitry that controls a display device to render the virtual world with a set of virtual elements. The rendered virtual world may represent a set of real-world locations of a geographical area. The circuitry may select a virtual element from the set of virtual elements and may control the display device based on the selection of the virtual element, to further render a set of objects inside the virtual world. The set of objects may represent a set of offerings that may be transactable and may be available with a seller associated the selected virtual element. The circuitry may receive a selection of an object of the set of objects and may execute a transaction for the object in the received selection. The transaction may be executed between the seller and a customer associated with the electronic device.

According to another embodiment of the disclosure, a method for rendering a virtual world for facilitating transactions between users in a neighborhood is provided. The method may include controlling a display device to render a virtual world with a set of virtual elements to represent a set of real-world locations of a geographical area. The method may further include selecting a virtual element from the set of virtual elements and controlling the display device based on the selection of the virtual element to further render a set of objects inside the virtual world. The set of objects may represent a set of offerings that may be transactable and may be available with a seller associated the selected virtual element. The method may further include receiving a selection of an object of the set of objects and executing, for the object in the received selection, a transaction between the seller and a customer associated with the electronic device.

According to another embodiment of the disclosure, a non-transitory computer-readable medium is provided. The non-transitory computer-readable medium may have stored thereon computer implemented instructions that, when executed by an electronic device, causes the electronic device to execute operations. The operations may include controlling a display device to render a virtual world with a set of virtual elements to represent a set of real-world locations of a geographical area. The operations may further include selecting a virtual element from the set of virtual elements and controlling the display device based on the selection of the virtual element to further render a set of objects inside the virtual world. The set of objects may represent a set of offerings that may be transactable and may be available with a seller associated the selected virtual element. The operations may further include receiving a selection of an object of the set of objects and executing, for the object in the received selection, a transaction between the seller and a customer associated with the electronic device.

DETAILED DESCRIPTION

Figure 1:
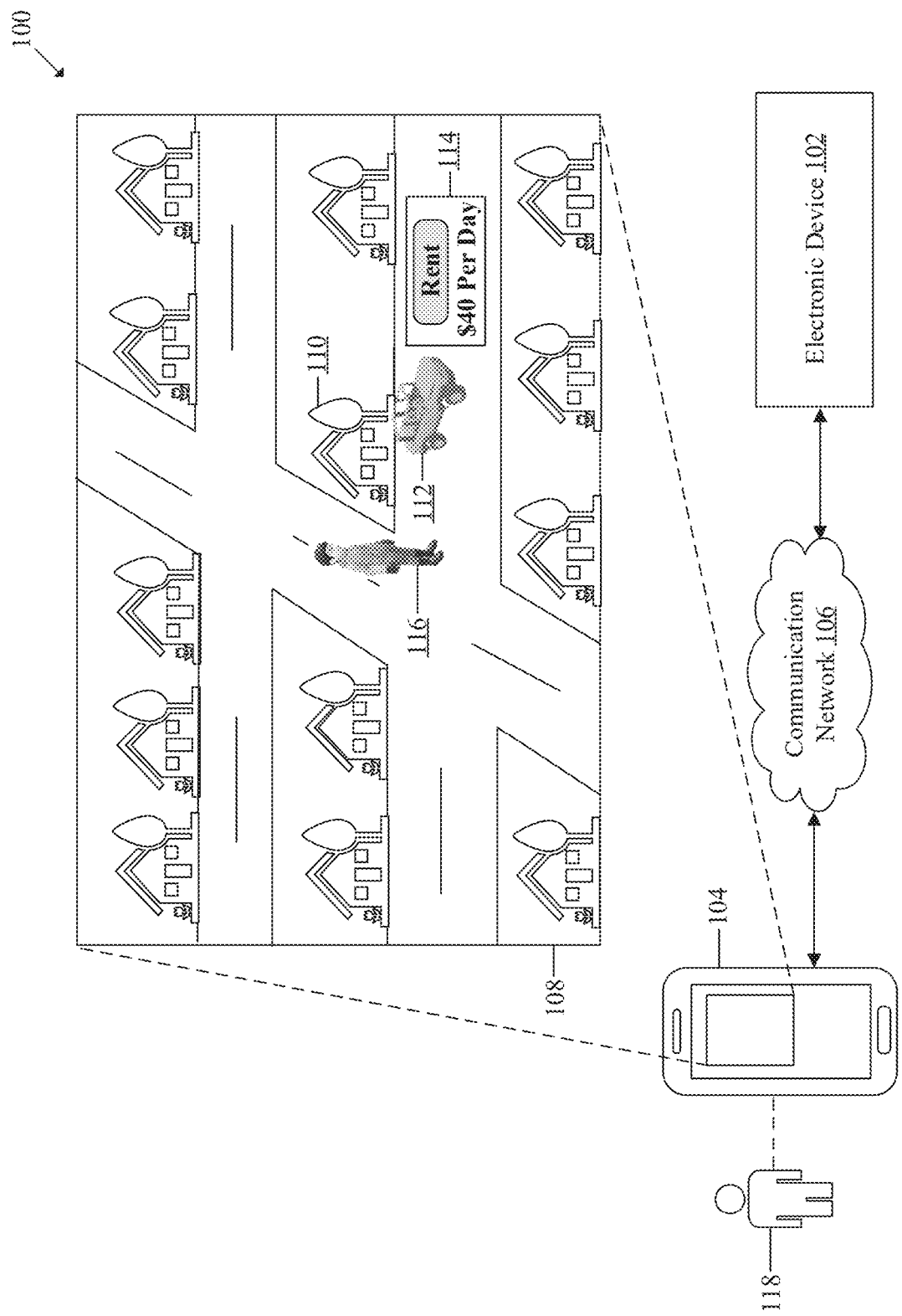
FIG. 1 is a block diagram that illustrates an exemplary network environment for rendering a virtual world for facilitating transactions between users in a neighborhood, in accordance with an embodiment of the disclosure.

The following described implementations may be found in the disclosed electronic device and method for rendering a virtual world for facilitating transactions between users in a neighborhood. Exemplary aspects of the disclosure may provide an electronic device (for example, a computing device, a tablet, or a smartphone) that may be configured to control a display device (for example, a Virtual Reality (VR) headset, smart glasses, or a smartphone, or a device having a display) to render a virtual world (for example, a three-dimensional (3D) VR environment or a two-dimensional (2D) VR environment) with a set of virtual elements to represent a set of real-world locations (for example, a neighborhood, a residential space, or a commercial space) of a geographical area.

At any time-instant, the electronic device may select a virtual element from the set of virtual elements and may control the display device based on the selection of the virtual element to render a set of objects (for example, a 3D graphical representation or a 2D graphical representation) inside the virtual world. The set of objects may represent a set of offerings (for example, a physical product, a service, a coupon, or a subscription) that may be transactable and available with a seller associated with the selected virtual element. The electronic device may receive a selection of an object (for example, a car) of the set of objects. For the object in the received selection, the electronic device may execute a transaction (for example, buy the car or avail on rent) between the seller and a customer associated with the electronic device.

Typically, customers interested in acquiring a product or availing a service may explore an e-commerce platform or a classified advertisement platform to look for products or services. These platforms may require searching for the product or service from an extensive repository. For example, if a customer is interested in a product, then the customer may view information (such as pricing information, reviews, or seller) associated with the product and may decide to purchase the product or avail the product on rent based on the information provided on the platform. In some instances, a customer may be interested in buying or renting items that are up for sale or rent in the neighborhood. For example, there may be neighbors or people living in the same block who may be interested in renting or selling/reselling products or services to trustworthy people in the local neighborhood. Ecommerce or classified advertisement platforms may lack features that may enable a customer to look for and buy products or services from people in the local neighborhood. Similarly, such platforms may lack features that may enable a seller to sell products or services to people in the local neighborhood.

To address such issues, the disclosed electronic device may leverage 2D/3D graphic rendering and map-based information to render a virtual world that includes virtual elements representing a real-world location such as a neighborhood, a street, or a city block. The rendered virtual world may include user interface (UI) elements that facilitate a customer (who may be interested in a product or a service) to physically or virtually look up a product or a service available with a known seller or a seller in a neighborhood of the customer or in a neighborhood that may be familiar to the customer. The UI elements in the rendered virtual world may allow the customer to contact a seller and virtually interact with the seller before deciding to purchase or avail on rent a product or a service.

According to an embodiment, the rendered virtual world may enable a customer, while roaming within the neighborhood, to view 2D/3D objects (for example, an e-scooter or a lawn mower) associated with virtual elements (e.g., homes or garages) in the virtual world. While the virtual elements may represent real-world locations, the appearance of such elements may or may not exactly match the appearance of real-world locations. As the customer approaches a real-world location (for example, a friend's house, a nearby brick-and-mortar store in the neighborhood, or a neighbor's house), a notification or an option may pop up on the electronic device to allow the customer to view object(s) (i.e., offerings such as a bike or a generator on rent) and further allow the customer to click on such object(s) to view details of the object(s) along with transaction option(s) in the virtual world.

According to another embodiment, the rendered virtual world may enable the customer to view the object(s) from a remote real-world location. The customer may be represented by an avatar (i.e., a 3D/2D model) that may be rendered at a virtual location in the virtual world. The virtual world may include UI elements to enable the customer to navigate the avatar across virtual locations in the virtual world. The product may be visualized when the user virtually traverses (by use of the avatar) along the virtual element representing the real-world location. The virtual world may include user interface elements, rendered in a proximity of the product, to enable the customer to execute transactions (for example, rent or buy) for the product by providing inputs via the user interface elements rendered in the virtual world.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for rendering a virtual world for facilitating transactions between users in a neighborhood, in accordance with an embodiment of the disclosure. With reference to FIG. 1, there is shown a network environment 100. The network environment 100 may include an electronic device 102 and a display device 104. The electronic device 102 may communicate with the display device 104 through a communication network 106. A virtual world 108 with a set of virtual elements may be rendered on the display device 104. The set of virtual elements may include a virtual element 110 (for example, a house). There is shown an object 112 (for example, a vehicle) that may be rendered inside the virtual world 108 based on a selection of the virtual element 110. A set of UI elements 114 associated with the object 112 may be rendered inside the virtual world 108. There is further shown an avatar 116, whose movement in the virtual world 108 may be controlled via UI elements. There is further shown a user 118 (for example, a customer) who may be associated with the electronic device 102. The virtual world 108, the set of virtual elements in virtual world 108, the object 112, the set of UI elements 114, and the avatar 116 in FIG. 1 are presented merely as an example and such an example should not be construed as limiting the disclosure.

In FIG. 1, the virtual world 108 is shown as a 3D VR environment. However, the disclosure may not be so limiting and in some embodiments, the virtual world 108 may be a 2D VR environment. The virtual elements shown in FIG. 1 are presented merely as an example and should not be construed as limiting the disclosure.

The electronic device 102 may include suitable logic, circuitry, interfaces, and/or code that may be configured to control the display device 104 to render the virtual world 108 with a set of virtual elements (that includes the virtual element 110). The virtual world 108 may include objects (such as the object 112) associated with the virtual elements. For example, a virtual element may represent a house of a seller and the object 112 may represent an offering (e.g., a car) that the seller wants to sell or rent. The object 112 may be rendered in the virtual world 108 based on a selection of the virtual element 110 or based on a real-world or virtual location of the user 118.

In accordance with an embodiment, the electronic device 102 may control the display device 104 to render one or more UI elements that may be used to control the movement of the avatar 116. The electronic device 102 may control the display device 104 to render the set of UI elements 114 and may execute a transaction associated with the object 112 based on one or more inputs received via the set of UI elements 114. Examples of the electronic device 102 may include, but are not limited to, an eXtended Reality (XR) headset, smart glasses, a smart watch, a wearable activity tracker, a personal computer such as a laptop, a tablet, a smartphone, a cellular phone, a mobile phone, a server, an edge device, a consumer electronic (CE) device, or a computing device.

The display device 104 may include suitable logic, circuitry, interfaces, and/or code that may be configured to render the virtual world 108, the virtual element 110, the object 112, the set of UI elements 114, and the avatar 116, based on instructions received from electronic device 102. Examples of the display device 104 may include, but are not limited to, a display, smart glasses, an Augmented Reality (AR) headset, a Virtual Reality (VR) headset, an XR headset, an AR goggle, or a VR goggle, a smart phone, a mobile phone, or a tablet. A person with ordinary skill in the art will understand that the scope of the disclosure may not be limited to the implementation of the display device 104 and the electronic device 102 as two separate entities. In certain embodiments, functionalities of the display device 104 may be incorporated in its entirety or at least partially in the electronic device 102, without a departure from the scope of the disclosure.

The communication network 106 may include a communication medium through which the electronic device 102 and the display device 104 may communicate with each other. The communication network 106 may be one of a wired connection or a wireless connection. Examples of the communication network 106 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN). The electronic device 102 and the display device 104 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive an input indicative of an instruction to render a virtual world that may be representative of a geographical area. For example, the input may include an address, a street, a geo-location, or a locality (neighborhood) of a city, a county, or a state. Based on the received input, the electronic device 102 may control the display device 104 to render the virtual world 108. In accordance with an embodiment, the display device 104 may be controlled to render the virtual world 108 with the set of virtual elements, based on a location of the electronic device 102 or that of the avatar 116 with respect to a set of real-world locations or virtual locations of the set of virtual elements.

The virtual world 108 may represent a set of real-world locations (for example, a city block with streets) of the geographical area. The virtual world 108 may include a set of virtual elements that may be representative of a set of real-world locations in the geographical area. For example, a house in real-world may be represented as a virtual element (e.g., a 3D model) in the virtual world. In accordance with an embodiment, the virtual world 108 with the set of virtual elements may be rendered based on information obtained from a location-based application in the electronic device 102. The location-based application may have a capability to render maps of different geographical locations, render 2D or 3D views of the geographical locations, render a current location of the electronic device 102, or render a route from a source location (for example, the current location of the electronic device 102) to a destination location.

The electronic device 102 may select the virtual element 110 from the set of virtual elements. In accordance with an embodiment, the virtual element 110 may be selected based on a location of the electronic device 102. The location of the electronic device 102 may be a real-world location of the electronic device 102 or a virtual location of the avatar 116. The avatar 116 in the virtual world 108 may represent the user 118 in the real-world.

In accordance with an embodiment, the set of virtual elements in the rendered virtual world 108 may be present within a threshold distance from the location of the electronic device 102 (or the avatar 116). The electronic device 102 may determine distances between the location of the electronic device 102 and each real-world location of the set of real-world locations. The virtual element 110 may be selected based on a determination that distance between a real-world location (corresponding to the virtual element 110) and the real-world location of the electronic device 102 is a minimum. Alternatively, a current location of the avatar 116 in the virtual world may represent the virtual location of the electronic device 102. The electronic device 102 may control the display device 104 to render UI elements that enable the user 118 to control the movement of the avatar 116 (or the current location of the avatar 116) in the virtual world 108. The UI elements may receive user inputs associated with a navigation of the avatar 116. Based on whether the rendered virtual world 108 is a 3D or 2D VR environment, the UI elements may enable the user 118 to navigate the avatar 116 in one or more directions. The electronic device 102 may select a virtual element from the set of virtual elements based on a proximity of the location of the avatar 116 in the virtual world 108 to the virtual element 110 in the virtual world 108. For example, the proximity of the location of the avatar 116 to the virtual element 110 may be minimum with respect to other virtual locations (or virtual elements) in the virtual world 108.

In accordance with another embodiment, the virtual element 110 may be selected based on a digital interaction with the virtual element 110. For example, the user 118 may perform the digital interaction with the virtual element 110 via the display device 104. The digital interaction may be performed while the user 118 is present at a real-world location or while the avatar 116 is present in proximity of the virtual element 110 in the virtual world 108. By way of example, and not limitation, the digital interaction may correspond to a scan of a real-world location using a camera application or an augmented reality application of the electronic device 102 (or the display device 104). Alternatively, the digital interaction may correspond to a touch input or a selection of a UI element in the virtual world 108. Based on the digital interaction, the electronic device 102 may select the virtual element 110 and may render information that informs the user 118 (and the seller) about the selection. Details pertaining to the selection of virtual elements in a virtual world are further provided, for example, in FIGS. 3, 4A, and 4B.

Based on the selection of the virtual element 110, the electronic device 102 may control the display device 104 to further render a set of objects inside the virtual world 108. The set of objects may represent a set of offerings that may be transactable and available with a seller associated the selected virtual element 110. The set of offerings may include a physical product (for example, a vehicle, an electronic device, a household item, and the like), a service (for example, a vehicle repairing service, a product delivery service, an aggregator service, and the like), a subscription (for example, subscription for access to a content or product, entertainment, a telecom plan, or the like), a virtual product (for example, an phone application, a software, a virtual token, a coupon, and the like), or a digital asset (for example, a digital currency, reward points for shopping, a promo code that may be used to fetch discounts on purchase of a product, and the like). An offering may be availed by executing a transaction between the user 118 and a seller associated with the selected virtual element 110.

In accordance with an embodiment, the electronic device 102 may render the object 112 (e.g., a physical object such as a vehicle) inside the virtual world 108. As shown in FIG. 1, the object 112 is a 3D graphical representation of a vehicle. In some embodiments, the object 112 may be rendered via a 2D graphical representation. In some instances, the object 112 may be rendered after the selection of the virtual element 110. The object 112 may represent an offering that may be available with the seller associated with the virtual element 110 and may be transactable (e.g., up for rent). Details pertaining to the rendering of objects in the virtual world are further provided, for example, in FIGS. 3, 4A, 4B, and 5.

At any time-instant, the electronic device 102 may receive a selection of an object of the set of objects. The selection may be received based on a user input via the display device 104. In some embodiments, UI elements associated with the object 112 may be rendered based on the selection of the object 112. The electronic device 102 may control the display device 104 to render UI elements that include descriptions of the set of objects, options to interact with the set of objects, viewing options for pricing information associated with the set of objects, and the like. As an example, the UI elements 114 may include an option to rent the object 112 and an option to view pricing information (for example, $40 per Day) associated with the object 112. In accordance with an embodiment, the UI elements 114 may be rendered in proximity of the object 112.

The electronic device 102 may execute, for the object 112 in the received selection, a transaction between the seller associated with the virtual element 110 and the customer associated with the electronic device 102. In accordance with an embodiment, the transaction may be executed based on a user input received via a radio button 'rent' (included as an UI element of the UI elements 114) rendered on the display device 104. If the transaction is successfully executed, the user 118 may receive a confirmation on rental purchase of an offering (i.e., the vehicle) represented by the object 112 for a price of $40 per day.

Figure 2:
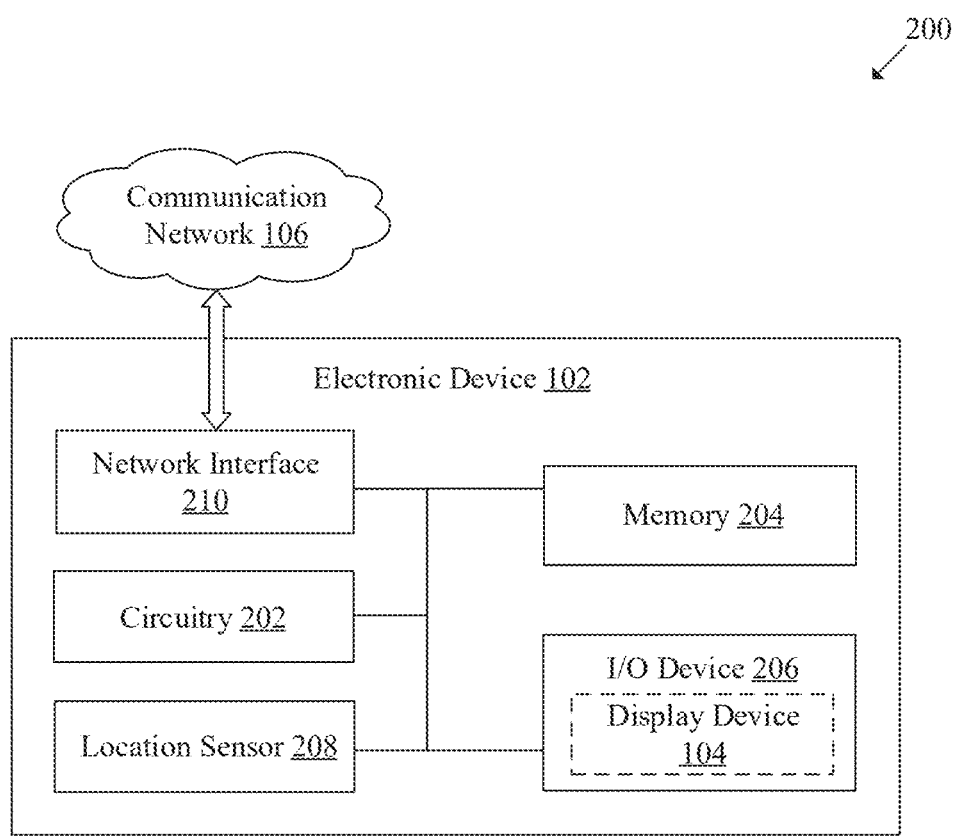
FIG. 2 is a block diagram that illustrates an exemplary electronic device that may render a virtual world for facilitating transactions between users in a neighborhood, in accordance with an embodiment of the disclosure.

FIG. 2 is a block diagram that illustrates an exemplary electronic device that may render a virtual world for facilitating transactions between users in a neighborhood, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a location sensor 208, and a network interface 210. The circuitry 202 may be communicatively coupled to the memory 204, the I/O device 206, the location sensor 208, and the network interface 210, through wired or wireless communication of the electronic device 102. Although in FIG. 2, it is shown that the electronic device 102 includes the circuitry 202, the memory 204, the I/O device 206, and the network interface 210; however, the disclosure may not be so limiting, and the electronic device 102 may include less or more components.

The circuitry 202 may include suitable logic, circuitry, and/or interfaces that may be configured to execute program instructions associated with different operations to be executed by the electronic device 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the electronic device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. In accordance with an embodiment, the memory 204 may be configured to store social relationships between the customer (i.e., the user 118) and sellers (for example, the seller associated with the virtual element 110) associated with real-world locations (that may be represented using virtual elements in a virtual world or different virtual worlds (rendered by the display device 104 at different times). The memory 204 may be further configured to store information associated with objects (for example, the object 112) based on selection of virtual elements (for example, the virtual element 110) rendered on a virtual world (for example, the virtual world 108). The memory 204 may further store information, fetched by the circuitry 202, of virtual elements (that represent real-world objects in different geographical areas) associated with objects that are similar to the object 112. The information fetched by the circuitry 202 may be stored based on selection of the object 112. The memory 204 may be further configured to store virtual worlds, rendered on the display device 104 at different time instances, representing real-world locations in geographical areas (for example, a block of a neighborhood). This may reduce latency involved in rendering of a virtual world with virtual locations representing a set of real-word locations of a geographical area, if the virtual world representing the geographical area has been previously rendered by the display device 104. The memory 204 may be further configured to store information associated with transactions have been executed between sellers of objects (for example, seller of the object 112) and the customer (i.e., the user 118) for the objects. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive user inputs from the user 118 to trigger initiation of execution of program instructions, by the circuitry 202, associated with different operations to be executed by the electronic device 102. Examples of the I/O device 206 may include, but are not limited to, a touch screen, a keyboard, a mouse, a joystick, a microphone, the display device 104, and a speaker.

In some embodiments, the I/O device 206 may include the display device 104. The inclusion may be based on incorporation of functionalities of the display device 104 in its entirety or at least partially in the electronic device 102. The display device 104 may include suitable logic, circuitry, and interfaces that may be configured to receive inputs from the circuitry 202 to render, on a display screen, one or more of the virtual world 108, the virtual element 110, the object 112, the UI elements 114, and the avatar 116. The display screen may be a touch screen which may enable the user 118 to provide a touch-input via the display device 104. The touch screen may be at least one of a resistive touch screen, a capacitive touch screen, or a thermal touch screen. The display device 104 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The location sensor 208 may include suitable logic, circuitry, and/or interfaces that may be configured to determine location information of the electronic device 102 or the display device 104. The location information may be fetched by the circuitry 202 to control the display device 104 to render a 3D or 2D VR environment that corresponds to a virtual world (for example, the virtual world 108). The location information may be used to control the display device 104 to further render a movement of an avatar (for example, the avatar 116) in a rendered virtual world (for example, the virtual world 108), where the movement is controlled via UI elements. Examples of the location sensor 208 may include, but are not limited to, a Global Navigation Satellite System (GNSS)-based sensor or an inertial motion unit, or an LTE-based positioning unit. Examples of the GNSS-based sensor may include, but are not limited to, global positioning sensor (GPS), Global Navigation Satellite System (GLONASS), or other regional navigation systems or sensors.

The network interface 210 may include suitable logic, circuitry, and interfaces that may be configured to facilitate communication between the circuitry 202 and the display device 104 via the communication network 106 (if functionalities of the display device 104 is not incorporated in its entirety or at least partially in the electronic device 102). The network interface 210 may be implemented by use of various known technologies to support wired or wireless communication of the electronic device 102 with the communication network 106. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in the FIGS. 3, 4A, 4B, 5A, 5B, and 6.

Figure 3:
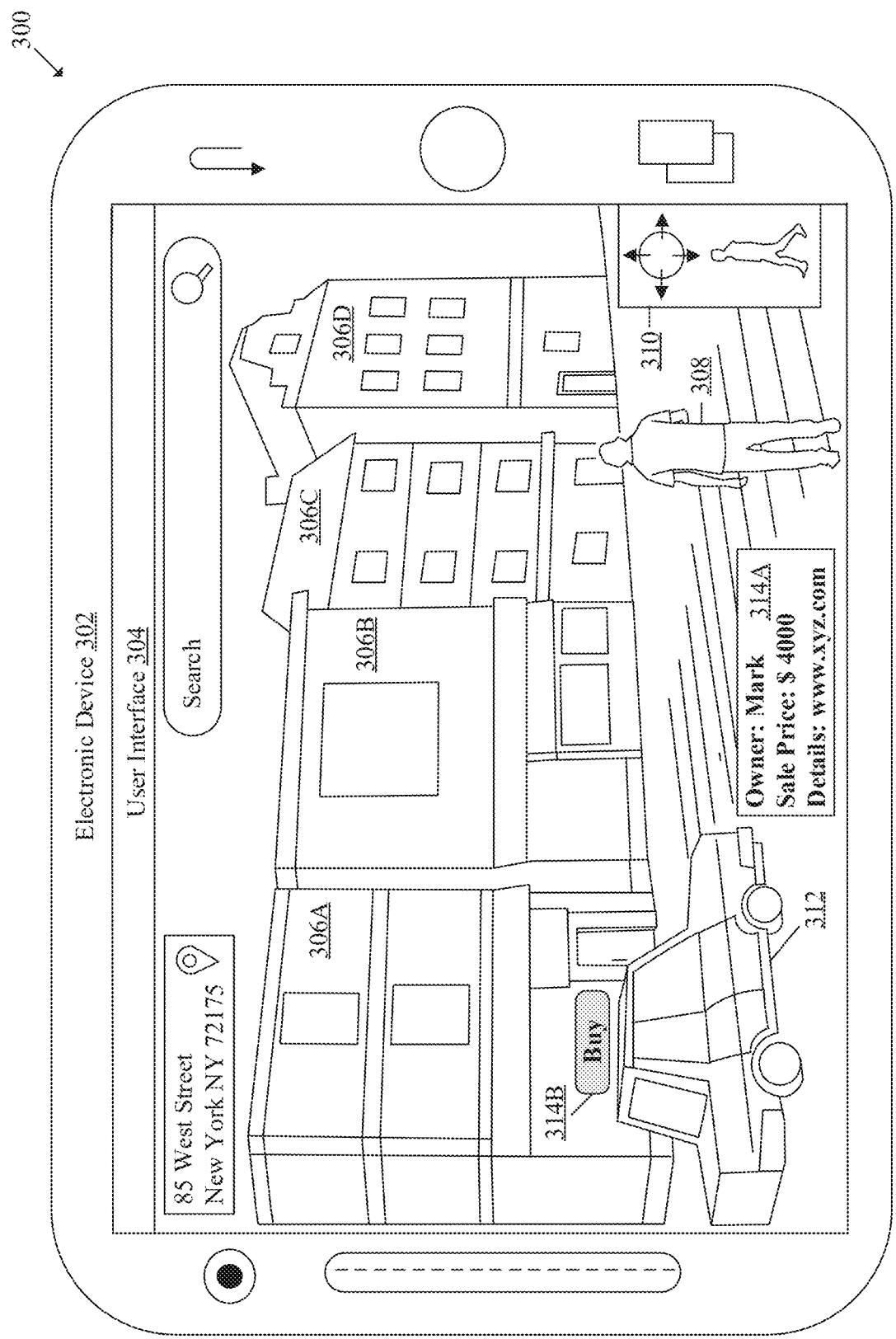
FIG. 3 is an exemplary scenario diagram that illustrates rendering of an object in a virtual world that corresponds to a three-dimensional (3D) Virtual Reality (VR) environment, in accordance with an embodiment of the disclosure.

FIG. 3 is an exemplary scenario diagram that illustrates rendering of a virtual world that corresponds to a three-dimensional (3D) Virtual Reality (VR) environment, in accordance with an embodiment of the disclosure. FIG. 3 is explained in conjunction with elements from FIG. 1 and FIG. 2. With reference to FIG. 3, there is shown an exemplary scenario diagram 300. In the exemplary scenario diagram 300, there is shown an electronic device 302 (for example, a cellular phone, a mobile phone or smartphone). The electronic device 302 may be an exemplary implementation of the electronic device 102. The electronic device 302 may include a display. The functionality of the display in the electronic device 302 may be identical to the display device 104 of FIG. 1.

During operation, the electronic device 302 may control the display to render a user interface 304 of a transaction client. The transaction client may facilitate transactions between a user (customer) associated with the electronic device 302 and a seller associated with a virtual element 306. The transaction client may be a software installed on the electronic device 302.

In accordance with an embodiment, the electronic device 302 may control the user interface 304 to render a virtual world that corresponds to a 3D VR environment. The 3D VR environment may be rendered based on a user input. The user input may indicate, for example, an instruction to render a virtual world that represents a geographical area such as 85 West Street, New York, NY 72175. The 3D VR environment may include a set of virtual elements 306A, 306B, 306C, and 306D (hereinafter, 306A . . . 306D). The set of virtual elements 306A . . . 306D may represent a set of real-world locations (for example, buildings in a residential area) on a street (i.e., the geographical area) or a city block. In accordance with an embodiment, the set of virtual elements 306A . . . 306D may correspond to a set of 3D virtual models of the residential space that corresponds to the set of real-world locations.

At any time-instant, the electronic device 302 may select a virtual element 306 (i.e., a 3D virtual model) from the set of virtual elements 306A . . . 306D. In accordance with an embodiment, the virtual element 306A may be selected based on a virtual location of the electronic device 302. The electronic device 302 may control the user interface 304 to render an avatar 308 inside the 3D VR environment. The location of the avatar 308 in the 3D VR environment may correspond to the virtual location of the electronic device 302. The user (i.e., customer) associated with the electronic device 302 may be located in a real-world location that may be different from a real-world location that corresponds to the location of the avatar 308 in the 3D VR environment. The electronic device 102 may select the virtual element 306 from the set of virtual elements based on a proximity of the location of the avatar 308 in the 3D VR environment to the location of the virtual element 306A in the 3D VR environment. The distance between the location of the avatar 308 and location of the virtual element 306A may be lowest amongst distances between the avatar 308 and each of the virtual elements 306B, 306C, or 306D.

The electronic device 302 may further control the user interface 304 to render a UI element 310. The UI element 310 may enable the customer associated with the electronic device 302 to control the movement of the avatar 308. The UI element 310 may enable navigation of the avatar 308 along 'East', "South', 'West', or 'North', directions (since the rendered virtual world is a 3D VR environment).

After the virtual element 306A is selected, the electronic device 302 may further control the user interface 304 to render an object 312 (for example, a car model) inside the 3D VR environment. The object 312 may represent an offering (e.g., a real-world car) that may be transactable and available with a seller associated the selected virtual element 306A. For example, the object 312 may be a 3D graphical representation that may be rendered in proximity of the virtual element 306A.

The electronic device 302 may further control the user interface 304 to render UI elements 314A and 314B. The UI elements 314A and 314B may be rendered in proximity of the object 312. The UI element 314A may indicate the object 312, a name (for example, Mark) of the seller associated with the virtual element 306A, pricing information (for example, $4000) associated with the offering (represented by the object 312), and a Universal Resource Locator (for example, www.xyz.com) that includes details of, or descriptions associated with offering. As shown, for example, the UI element 314B corresponds to a radio button 'Buy'. The electronic device 402 may receive a user input via the radio button if the customer intends to buy the car (i.e., the object 312) at the price indicated in the UI element 314B.

For the offering represented by the object 312, the electronic device 302 may execute a transaction between the seller associated with the virtual element 306A and the customer associated with the electronic device 302. In accordance with an embodiment, the transaction may be executed based on an input received via the radio button 'buy' (UI elements 314B) rendered in the 3D VR environment.

Figure 4A:
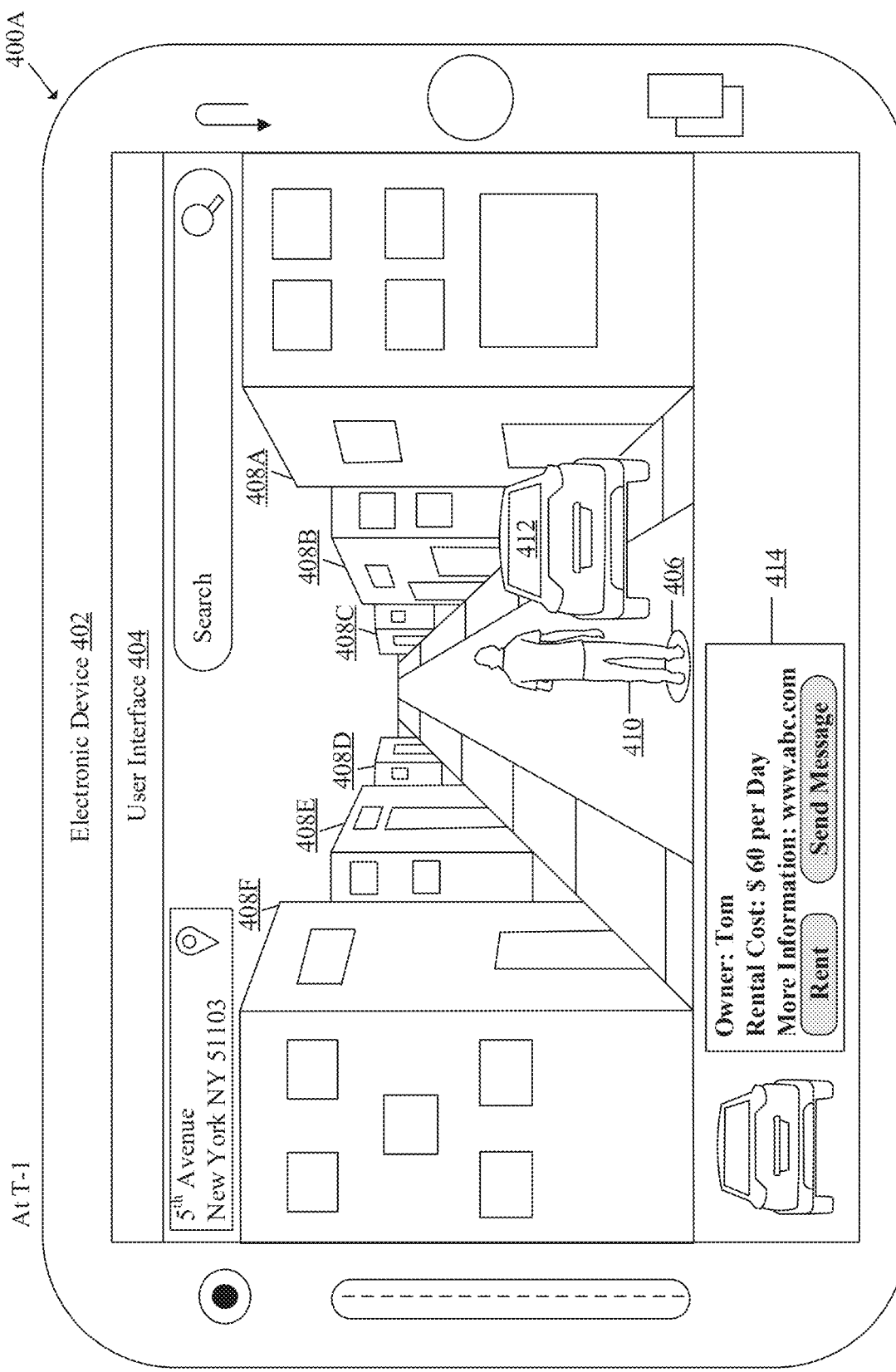
FIG. 4A is an exemplary scenario diagram that illustrates rendering of an object associated with a virtual element selected based on a location of the electronic device of FIG. 1, in accordance with an embodiment of the disclosure.

FIG. 4A is an exemplary scenario diagram that illustrates rendering of an object associated with a virtual element selected based on a location of the electronic device of FIG. 1, in accordance with an embodiment of the disclosure. FIG. 4A is explained in conjunction with elements from FIG. 1, FIG. 2, and FIG. 3. With reference to FIG. 4A, there is shown an exemplary scenario diagram 400A. In the exemplary scenario diagram 400A, there is shown an electronic device 402. The electronic device 402 is an exemplary implementation of the electronic device 102. The electronic device 402 may include a display. The functionality of the display may be identical to the display device 104 of FIG. 1.

During operation, the electronic device 402 may control the display of the electronic device 402 to render a user interface 404 of a transaction client. The transaction client may facilitate transactions between a customer associated with the electronic device 402 and a seller associated with a virtual element.

At T-1, the electronic device 402 may detect a current location of the electronic device 402. For example, the current location may be a first location 406, i.e., "5th Avenue, New York NY 51103". After the location is detected, the electronic device 402 may determine a set of real-world locations (e.g., residences) within a threshold distance from the first location 406. The determination may be based on information obtained from a map-based application on the electronic device 402 or via an Application Programming Interface (API) call to a map server. The electronic device 402 may control the user interface 404 to render a virtual world that includes a set of virtual elements 408A . . . 408F. The virtual world may be a 3D VR environment. The set of virtual elements 408A . . . 408F may correspond to the set of real-world locations that may be present within the threshold distance from the first location 406. In FIG. 4A, the set of virtual elements 408A . . . 408F is presented merely as an example and such an example should not be construed as limiting the disclosure. In some embodiments, the rendered virtual world may include less than six virtual elements or more than six virtual elements, without a departure from the scope of the disclosure.

In accordance with an embodiment, the electronic device 402 may further control the user interface 404 to render an avatar 410. The current location of the avatar 410 in the virtual world may correspond to the current location (i.e., the first location 406) of the electronic device 402 or a location selected by the customer (i.e., the user 118). The avatar 410 may represent a customer who may be interested in buying or availing on renting one or more offerings that may have been put on sale by sellers associated with the set of virtual elements 408A . . . 408F. In accordance with an embodiment, the movement of the avatar 410 (i.e., update of the location of the avatar 410) in the virtual world may synchronize with a change in the current location of the electronic device 402. The update of the current location of the electronic device 402 may be performed based on a movement of the customer who may be carrying the electronic device 402.

The electronic device 402 may determine a distance between the first location 406 (i.e., a current location of the electronic device 402) and each real-world location of the set of real-world locations (represented by the set of virtual elements 408A . . . 408F). Based on the determined distance, the electronic device 402 may select the virtual element 408A of the set of virtual elements 408A . . . 408F. The virtual element 408A may be selected based on a determination that the distance between a real-world location, (corresponds to the virtual element 408A) and the first location 406 is a minimum amongst distances between each of the real-world locations and the first location 406.

After the virtual element 408A is selected, the electronic device 402 may further control the user interface 404 to render an object 412 (for example, a 3D car model) inside the virtual world. The object 412 may be a 3D graphical representation of a real-world offering such as a vehicle. The object 412 may be rendered in proximity of the virtual element 408A and may be available with the seller associated with the virtual element 408A as an offering.

The object 412 in FIG. 4A is presented merely as an example and such an example should not be construed as limiting the disclosure. In some embodiments, a set of objects may be rendered inside the virtual world. The electronic device 402 may receive a user input indicative of selection of an object (for example, the object 412) from the set of objects.

The electronic device 402 may further control the user interface 404 to render a UI element 414. The UI element 414 may be rendered in proximity of the object 412 outside (or inside) the virtual world. By way of example, and not limitation, the UI element 414 may indicate a name (for example, Tom) of the seller associated with the virtual element 408A (where an offering represented by the object 412 is available for rent), pricing information (for example, $60 per Day), a URL (for example, www.abc.com) that includes details of or descriptions associated with the object 412, and buttons such as 'Rent' and 'Send Message'. The electronic device 402 may receive a user input via the radio button 'Rent' if the customer intends to avail the offering (i.e., represented by the object 412) on rent at the price indicated on the UI element 414. Additionally, or alternatively, the electronic device 402 may receive a user input via the radio button "Send Message", if the customer intends to interact with the seller to negotiate the rental price, to receive details of renting agreement, or to receive information associated with the offering.

For the offering represented by the object 412, the electronic device 402 may execute a transaction between the seller associated with the virtual element 408A and the customer associated with the electronic device 402. In accordance with an embodiment, the transaction may be executed based on an input received via the radio button 'rent'.

Figure 4B:
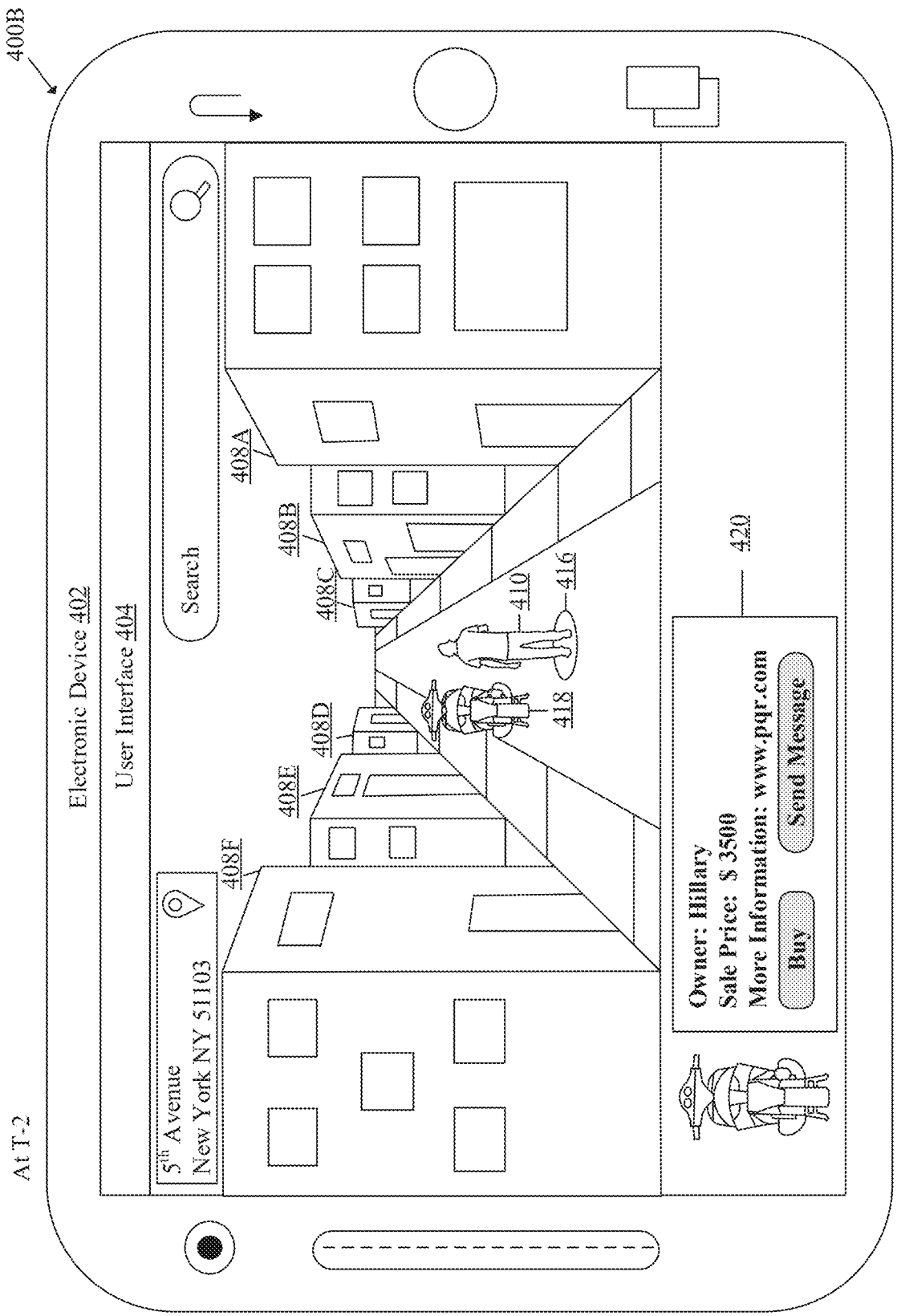
FIG. 4B is an exemplary scenario diagram that illustrates rendering of an object associated with a virtual element selected based on a location of the electronic device of FIG. 1, in accordance with an embodiment of the disclosure.

FIG. 4B is an exemplary scenario diagram that illustrates rendering of an object associated with a virtual element selected based on a location of the electronic device of FIG. 1, in accordance with an embodiment of the disclosure. FIG. 4B is explained in conjunction with elements from FIG. 1, FIG. 2, FIG. 3, and FIG. 4A. With reference to FIG. 4B, there is shown an exemplary scenario diagram 400B. In the exemplary scenario diagram 400B, there is shown the electronic device 402 that may be configured to control the user interface 404.

At T-2, the electronic device 402 may detect a current location of the electronic device 402. For example, the current location may be a second location 416 i.e., "5th Avenue, New York NY 51103". The electronic device 402 may determine a set of real-world locations within a threshold distance from the second location 416. The user interface 404 may be controlled to render a virtual world that includes the set of virtual elements 408A . . . 408F. The set of virtual elements 408A . . . 408F may correspond to the set of real-world locations within the threshold distance from the second location 416.

In accordance with an embodiment, the electronic device 402 may further control the user interface 404 to render the avatar 410. The current location of the avatar 410 in the virtual world may correspond to the second location 416. Therefore, as the current location of the electronic device 402 is updated (at T-2) from the first location 406 to the second location 416, the location of the avatar 410 in the virtual world may change (at T-2) with respect to the location of the avatar 410 in the virtual world at T-1 (see FIG. 4A).

The electronic device 402 may determine a distance between the second location 416 and each real-world location of the set of real-world locations that correspond to the set of virtual elements 408A . . . 408F. Based on the determined distances, the electronic device 402 may select the virtual element 408E from the set of virtual elements 408A . . . 408F. The distance between a real-world location (that corresponds to the virtual element 408E) and the second location 416 may be a minimum amongst the distances between each of the real-world locations (of the set of real-world locations) and the second location 416.

After the virtual element 408E is selected, the electronic device 402 may further control the user interface 404 to render an object 418 (for example, a scooter model) inside the virtual world. The object 418 may be a 3D graphical representation of an offering (e.g., a scooter) that may be rendered in proximity of the virtual element 408E. The rendering may be performed because the offering may be available with the seller associated with the virtual element 408E for purchase or rental options The electronic device 402 may further control the user interface 404 to render a UI element 420. In accordance with an embodiment, the user interface 404 may render the UI element 420 in proximity of the object 418 and outside the virtual world. The UI element 420 may indicate a name (for example, Hillary) of the seller associated with the virtual element 408E, pricing information (for example, $3500) for offerings, a URL (for example, www.pqr.com) that includes details associated with or descriptions of the offering, and radio buttons 'Buy' and 'Send Message'. The electronic device 402 may receive a user input via the radio button 'Buy' if the customer intends to buy the object 418 at the price indicated in the UI element 420. Similarly, the electronic device 402 may receive a user input via the radio button 'Send Message' if the customer intends to interact with the seller.

For the offering represented by the object 418, the electronic device 402 may execute a transaction between the seller associated with the virtual element 408E and the customer associated with the electronic device 402. In accordance with an embodiment, the transaction may be executed based on an input received via the radio button 'buy'.

Figure 5A:
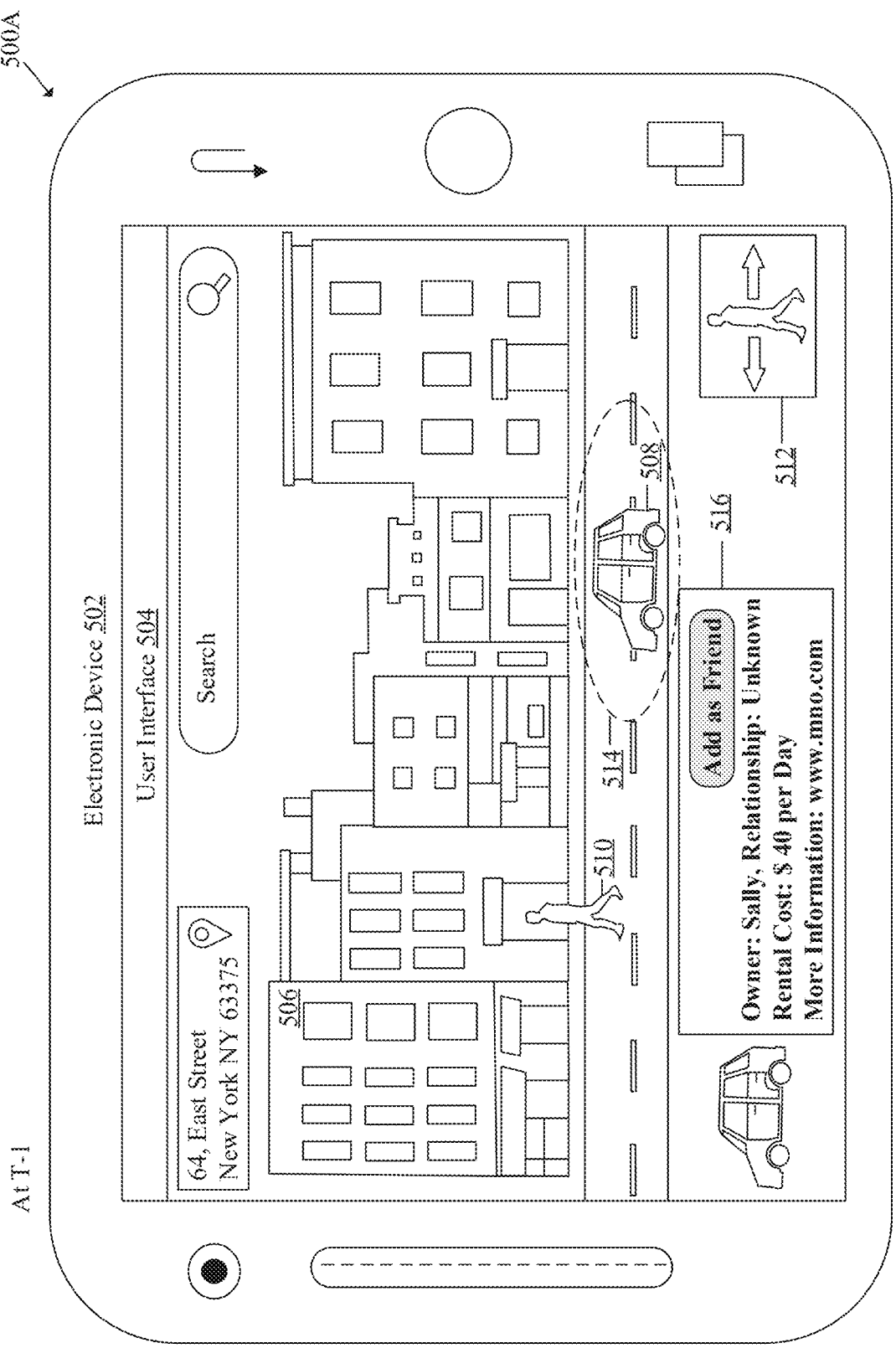
FIG. 5A is an exemplary scenario diagram that illustrates rendering of a virtual world that corresponds to a two-dimensional (2D) VR environment, in accordance with an embodiment of the disclosure.

FIG. 5A is an exemplary scenario diagram that illustrates rendering of a virtual world that corresponds to a two-dimensional (2D) VR environment, in accordance with an embodiment of the disclosure. FIG. 5A is explained in conjunction with elements from FIG. 1, FIG. 2, FIG. 3, FIG. 4A, and FIG. 4B. With reference to FIG. 5A, there is shown an exemplary scenario diagram 500A. In the exemplary scenario diagram 500A, there is shown an electronic device 502. The electronic device 502 may be an exemplary implementation of the electronic device 102 of FIG. 1.

During operation, the electronic device 502 may control a display of the electronic device 502 to render a user interface 504 of a transaction client that facilitates transactions between a customer associated with the electronic device 502 and a seller associated with a virtual element 506. The transactions may be executed based on a social relationship between the customer and the seller.

At T-1, the electronic device 502 may control the user interface 504 to render a virtual world that corresponds to a 2D VR environment. The 2D VR environment may be rendered based on a user input indicative of an instruction to render the 2D VR environment. The 2D VR environment may represent a set of real-world locations of a geographical area (for example, 64 East Street, New York, NY 63375). The real-world locations may be represented via a grid-pattern or a progressive linear arrangement of a set of virtual elements. Each virtual element of the set of virtual elements may be a virtual model of a residential space that corresponds to the set of real-world locations in the geographical area. The virtual world (i.e., 2D VR environment) may be rendered to include a virtual element 506 (i.e., a 2D virtual model) of the set of virtual elements, or an object 508 at a virtual location in the virtual world. The object 508 may be a 2D graphical representation. The user interface 504 may render the object 508 (for example, a car) to represent an offering that may be transactable and available with the seller associated with the virtual element 506. The determination of the virtual location, and the rendering of the virtual element 506 or the object 508 at the virtual location may be performed based on the social relationship (determined by the electronic device 502) between the customer and the seller.

The electronic device 502 may select the virtual element 506 from the set of virtual elements. In accordance with an embodiment, the virtual element 506 may be selected based on a virtual location of the electronic device 502. The electronic device 502 control the user interface 504 to render an avatar 510 in the 2D VR environment. The location of the avatar 510 in the 2D VR environment may correspond to the virtual location of the electronic device 502. The customer associated with the electronic device 502 may be located at a real-world location in a geographical area that may be same as or different from a real-world location that corresponds to the location of the avatar 510 in the 2D VR environment. The electronic device 502 may select the virtual element 506 from the set of virtual elements based on a proximity of the location of the avatar 510 in the 2D VR environment to the location of the virtual element 506 in the 2D VR environment.

The electronic device 502 may further control the user interface 504 to render an UI element 512. The UI element 512 may enable the customer associated with the electronic device 502 to control the movement of the avatar 510. Also, the UI element 512 may enable the customer to navigate the avatar 510 in 'Left' or 'Right' directions along a progressive linear arrangement of the set of virtual elements in the 2D VR environment.

After the virtual element 506 is selected, the electronic device 502 may be configured to determine the social relationship between the customer associated with the electronic device 502 and the seller associated with a virtual element 506.

At or after T-1, the electronic device 102 may determine that the social relationship between the customer and seller is 'Unknown'. Based on the determination of the social relationship, the electronic device 502 may determine a virtual location 514 in the virtual world (i.e., 2D VR environment) at which the virtual element 506 or the object 508 may have to be rendered. The virtual location 514 may be a randomized version of a real-world location of the set of real-world locations. For example, the object 508 may be rendered at the virtual location 514 since the social relationship between the customer and the seller (selling or renting an offering represented by the object 508) is 'Unknown'.

The electronic device 102 may further control the user interface 504 to render a UI element 516 that indicates the determined social relationship (i.e., 'Unknown') between the customer and the seller. The UI element 516 may include a radio button 'Add as Friend' that allows the customer to send a friendship request to the seller. The electronic device 502 may receive a user input from the customer via the radio button 'Add as Friend' if the customer intends to add the seller as a friend (or a neighbor). In some instances, the social relationship must exist for execution of any transaction between the seller and the customer. After the user input is received via the radio button 'Add as Friend', the electronic device 502 may transmit a message to an electronic device associated with the seller. The message may indicate that the customer is requesting to add the seller as a friend (or a neighbor).

The user interface 504 may render the UI element 516 in proximity of the object 508 outside the virtual world. The UI element 516 may indicate a name (for example, Sally) of the seller associated with the virtual element 506, pricing information (for example, $40 per Day) associated with the offering (i.e., represented by object 508), and a URL (for example, www.mno.com) that includes details of, or descriptions associated with the object 508.

Figure 5B:
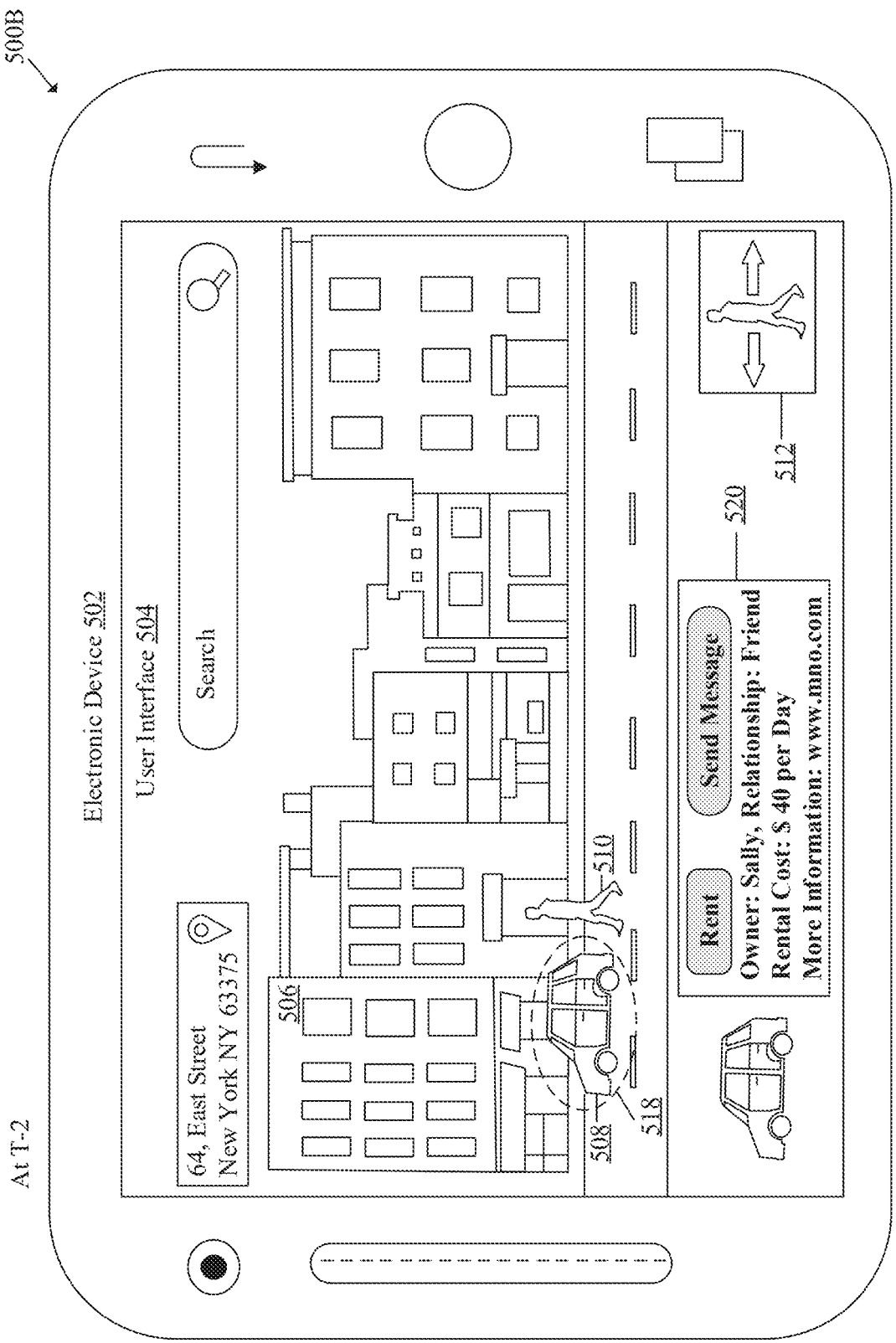
FIG. 5B is an exemplary scenario diagram that illustrates rendering of an object inside the 2D VR environment of FIG. 5A based on a social relationship between a customer and a seller, in accordance with an embodiment of the disclosure.

FIG. 5B is an exemplary scenario diagram that illustrates rendering of an object inside the 2D VR environment of FIG. 5A based on a social relationship between a customer and a seller, in accordance with an embodiment of the disclosure. FIG. 5B is explained in conjunction with elements from FIG. 1, FIG. 2, FIG. 3, FIG. 4A, FIG. 4B, and FIG. 5A. With reference to FIG. 5B, there is shown an exemplary scenario diagram 500B. In the exemplary scenario 500B, there is shown the electronic device 502. The electronic device 502 may be configured to control the user interface 504.

At T-2, the electronic device 502 may determine the social relationship between the customer associated with the electronic device 502 and the seller associated with a virtual element 506. The social relationship may be determined based on a reception of a message that indicates acceptance of the request sent by the electronic device 502. The message may be generated in response to an input from the electronic device associated with the seller. After the message is received, the electronic device 102 may determine the social relationship between the customer and the seller as 'Friends' (or 'Neighbors'). Based on the social relationship, the electronic device 502 may further determine a virtual location 518 in the virtual world (i.e., 2D VR environment) at which the virtual element 506 or the object 508 may have to be rendered. The virtual location 518 may be an exact location that corresponds to a real-world location of virtual element 506. For example, the object 508 may be rendered at the virtual location 518 since the determined social relationship between the customer and the seller is 'Friends' (or 'Neighbors').

The electronic device 502 may further control the user interface 504 to render a UI element 520. The UI element 520 may be rendered in proximity of the object 508 and outside the virtual world. Based on the social relationship, the user interface 504 may indicate on UI element 520, the social relationship (i.e., 'Friends') between the customer and the seller. The UI element 520 may further indicate the name (i.e., Sally) of the seller associated with the virtual element 506, the pricing information (i.e., $40 per Day), the URL (i.e., www.mno.com) that includes details of, or descriptions associated with, the object 508, and radio buttons 'Rent' and 'Send Message'.

The electronic device 502 may receive a user input via the radio button 'Buy' if the customer intends to rent the object 508 at the price indicated in the UI element 520. Similarly, the electronic device 502 may receive a user input via the radio button 'Send Message' if the customer intends to interact with the seller.

Figure 6:
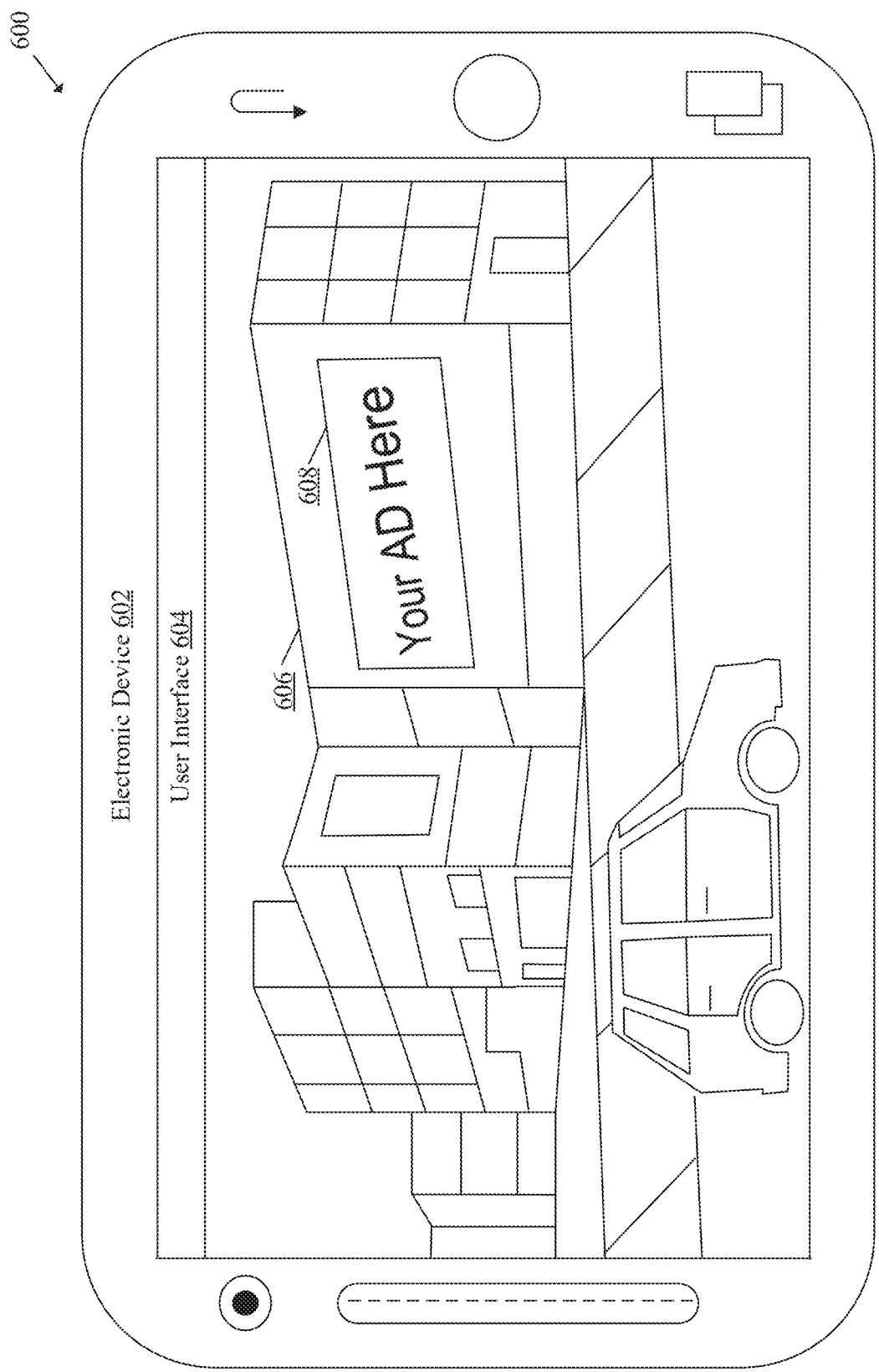
FIG. 6 is an exemplary scenario diagram that illustrates rendering of an advertisement in a virtual space of a 3D VR environment, in accordance with an embodiment of the disclosure.

FIG. 6 is an exemplary scenario diagram that illustrates rendering of an advertisement in a virtual space of a 3D VR environment, in accordance with an embodiment of the disclosure. FIG. 6 is explained in conjunction with elements from FIG. 1, FIG. 2, FIG. 3, FIG. 4A, FIG. 4B, FIG. 5A, and FIG. 5B. With reference to FIG. 6, there is shown an exemplary scenario diagram 600. In the exemplary scenario diagram 600, there is shown an electronic device 602. The electronic device 602 may be an exemplary implementation of the electronic device 102. The electronic device 602 may include a display. The functionality of the display in the electronic device 602 may be identical to the display device 104 of FIG. 1.

During operation, the electronic device 602 may control the display to render a user interface 604. On the user interface 604, the electronic device 602 may render a virtual world that corresponds to a 3D VR environment. The 3D VR environment may include a set of virtual elements that represent a set of real-world locations (for example, buildings) in a geographical area. The electronic device 602 may be used to select a virtual element 606 (i.e., a 3D virtual model) from the set of virtual elements. The selected virtual element 606 may include a virtual space 608. The electronic device 602 may control a display device (i.e., the display screen of the electronic device 602) to render an advertisement on the virtual space 608. The virtual space 608 may lie in a proximity of the virtual element 606. For example, the virtual space 608 may correspond to an exterior of the virtual element 606 where the advertisement may be rendered.

Figure 7:
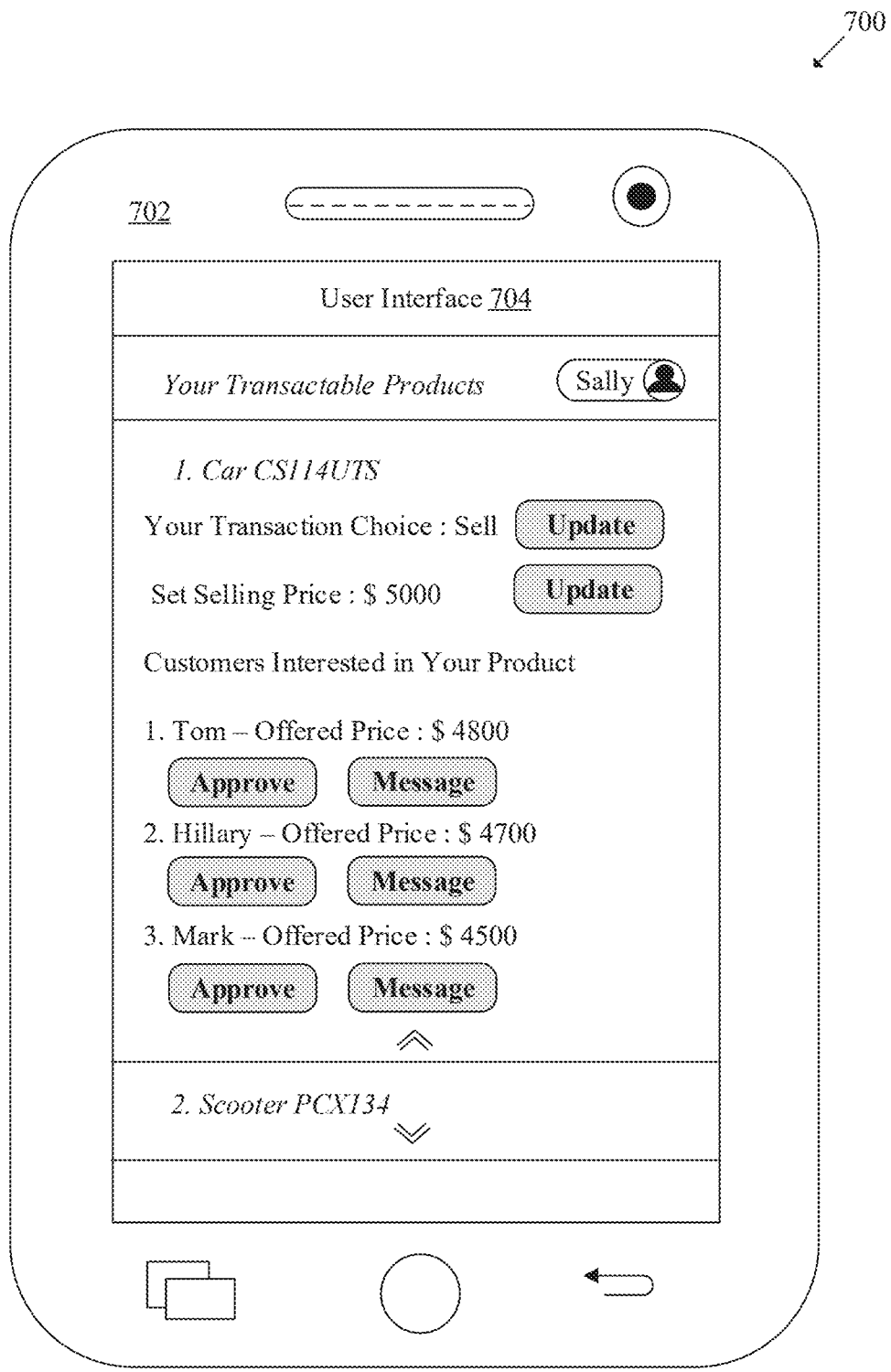
FIG. 7 is an exemplary scenario diagram that illustrates rendering of a user interface on an electronic device associated with a seller, in accordance with an embodiment of the disclosure.

FIG. 7 is an exemplary scenario diagram that illustrates rendering of a user interface on an electronic device associated with a seller, in accordance with an embodiment of the disclosure. FIG. 7 is explained in conjunction with elements from FIG. 1, FIG. 2, FIG. 3, FIG. 4A, FIG. 4B, FIG. 5A, FIG. 5B, and FIG. 6. With reference to FIG. 7, there is shown an exemplary scenario diagram 700. In the exemplary scenario diagram 700, there is shown an electronic device 702 (for example, a cellular phone, a mobile phone or smartphone). The electronic device 702 shown in FIG. 7 is presented merely as an example and such an example should not be construed as limiting the disclosure. The electronic device 702 may include a display (for example, a display screen).

During operation, the electronic device 702 may control the display screen to render a user interface 704 of a transaction client. The user interface 704 of the transaction client may allow a user (e.g., seller) associated with the electronic device 702 to perform transactions with one or more users (e.g., customers or other sellers) associated with electronic devices (such as the electronic device 102). For example, the seller (for example, Sally) may intend to sell a first offering (for example, a car with model number CS114US) and a second offering (for example, a scooter with model number PCX134).

The electronic device 702 may receive a user input that corresponds to a selection of a first object that represents the first offering in the virtual world. The user interface 704 may be controlled to render information associated with the first offering, based on the selection. The information may include a transactional choice (for example, sell) of the seller associated with the first offering, pricing information (for example, $5000) associated with the first offering, and one or more customers (for example, Tom, Hillary, and Mark) who may be interested in acquiring the first offering (i.e., a car with model number CS114UTS). For each interested customer (for example, Mark), the user interface 704 may render an offer price (for example, $4500) that refers to a price at which the customer may be interested in buying the product (or availing the product on rent), and radio buttons 'Approve', and 'Message'. The electronic device 702 may receive user inputs (from seller Sally) via the radio buttons.

If the seller intends to sell the product to the customer at the offered price, the electronic device 702 may receive a user input via the radio button 'Approve'. Similarly, the electronic device 702 may receive a user input via the radio button 'Message' if the seller intends to negotiate, for the offer price, with the customer for selling the first object.

Figure 8:
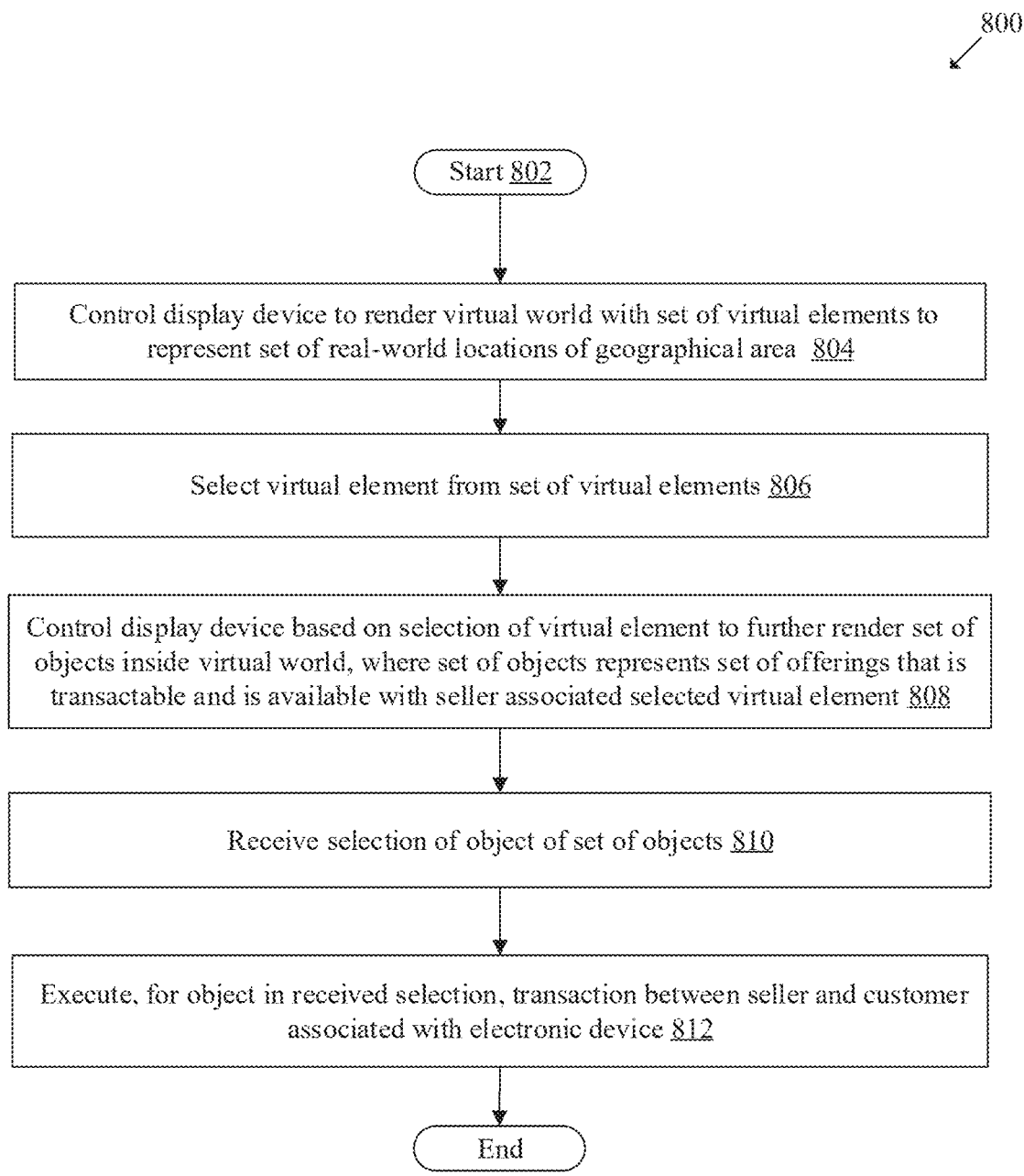
FIG. 8 is a flowchart that illustrates exemplary operations for rendering of a virtual world for facilitating transactions between users in a neighborhood, in accordance with an embodiment of the disclosure The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

FIG. 8 is a flowchart that illustrates exemplary operations for rendering of a virtual world for facilitating transactions between users in a neighborhood, in accordance with an embodiment of the disclosure. The flowchart 800 is described in conjunction with elements from FIGS. 1, 2, 3, 4A, 4B, 5A, 5B, 6, and 7. With reference to FIG. 8, there is shown a flowchart 800. The operations from 802 to 812 may be implemented, for example, by the electronic device 102 of FIG. 1 or the circuitry 202 of FIG. 2. The operations of the flowchart 800 may start at 802 and proceed to 804.

At 804, a display device 104 may be controlled to render a virtual world 108 with a set of virtual elements to represent a set of real-world locations of a geographical area. The electronic device 102 may be configured to control the display device 104 to render the virtual world 108 with the set of virtual elements to represent the set of real-world locations of the geographical area. Details of rendering of a virtual world, are described, for example, in FIGS. 1, 3, 4A, 4B, 5A, and 5B.

At 806, a virtual element 110 from the set of virtual elements may be selected. The electronic device 102 may select the virtual element 110 from the set of virtual elements. Details of selection of a virtual element from a set of virtual elements, are described, for example, in FIGS. 1, 3, 4A, and 4B.

At 808, the display device 104 may be controlled based on the selection of the virtual element 110 to further render a set of objects inside the virtual world 108. The electronic device 102 may control the display device 104 based on the selection of the virtual element 110 to further render the set of objects inside the virtual world 108. The set of objects may represent a set of offerings that is transactable and is available with a seller associated the selected virtual element

110. Details of rendering of objects inside a virtual world, are described, for example, in FIGS. 1, 3, 4A, 4B, 5A, and 5B.

At 810, a selection of an object 112 of the set of objects may be received. The electronic device 102 may receive a selection of the object of the set of objects. Details of selection of an object from a set of objects, are described, for example, in FIG. 1.

At 812, a transaction, for the object 112 in the received selection, between the seller and a customer (i.e., the user 118) associated with the electronic device 102, may be executed. The electronic device 102 may execute, for the object 112 in the received selection, a transaction between the seller and the user 118 associated with the electronic device 102. Details of execution of transactions for objects, are described, for example, in FIGS. 1, 3, 4A, 4B, and 5B.

Although the flowchart 800 is illustrated as discrete operations, such as 804, 806, 808, 810, and 812, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the electronic device 102) for rendering a virtual world (such as the virtual world 108) for facilitating transactions between users (such as the user 118) in a neighborhood. The set of instructions may be executable by the machine and/or the computer to perform operations that may include control of a display device 104 to render a virtual world 108 with a set of virtual elements, to represent a set of real-world locations of a geographical area. The operations may further include selection of a virtual element 110 from the set of virtual elements. The operations may further include control of the display device 104 based on the selection of the virtual element 110 to further render a set of objects inside the virtual world 108. The set of objects may represent a set of offerings that is transactable and is available with a seller associated the selected virtual element 110. The operations may further include reception of a selection of an object 112 of the set of objects. The operations may further include execution, for the object 112 in the received selection, of a transaction between the seller and a customer (i.e., user 118) associated with the electronic device 102.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

What is claimed is:

1. A first electronic device, comprising:
   a memory that stores a plurality of social relationships between a customer and each of a plurality of sellers; and
   circuitry that:
   controls a display device of the first electronic device to render a virtual world with a set of virtual elements to represent a set of real-world locations of a geographical area;
   selects a virtual element from the set of virtual elements;
   determines, based on the selected virtual element, a social relationship between the customer and a seller associated with the selected virtual element, wherein the customer is associated with the display device, the plurality of social relationships includes the social relationship, and
   the plurality of sellers includes the seller;
   determines, based on the social relationship, a virtual location in the virtual world at which an object of a set of objects is to be rendered, wherein the memory further stores the set of objects;
   controls the display device based on the selection of the virtual element to further render the set of objects inside the virtual world,
   wherein the set of objects represents a set of offerings that is transactable and is available with the seller;
   select the object of the set of objects based on a first user input, wherein the object is rendered at the virtual location in the virtual world;

controls the display device to further render a first User Interface (UI) element in proximity of the object;

receives, via the first UI element, a second user input to purchase an offering associated with the object;

receives a third user input, from a second electronic device associated with the seller, that includes approval of the purchase, wherein the circuitry is communicatively coupled to the second electronic device associated with the seller; and executes, for the selected object, a transaction between the seller and the customer, based on the third user input.

2. The first electronic device according to claim 1, wherein the virtual world is a three-dimensional (3D) Virtual Reality (VR) environment, and the set of virtual elements are a set of 3D virtual models of residential spaces that correspond to the set of real-world locations.

3. The first electronic device according to claim 1, wherein the virtual world is a two-dimensional (2D) Virtual Reality (VR) environment that represents the set of real-world locations via a grid-pattern or a progressive linear arrangement of the set of virtual elements, and the set of virtual elements are virtual models of residential spaces that correspond to the set of real-world locations.

4. The first electronic device according to claim 1, wherein the circuitry further detects a location of the first electronic device, and wherein the virtual world is rendered based on the location and the set of virtual elements represents the set of real-world locations that are within a threshold distance from the location of the first electronic device.

5. The first electronic device according to claim 4, wherein the circuitry further determines a distance between the location of the first electronic device in the virtual world and each real-world location of the set of real-world locations, and wherein the virtual element is selected based on:
a determination that the distance between the location of the first electronic device and a real-world location of the set of real-world locations is a minimum, and the real-world location corresponds to the virtual element.

6. The first electronic device according to claim 1, wherein the circuitry further receives an input that includes a digital interaction with the virtual element, and wherein the virtual element is selected based on the digital interaction.

7. The first electronic device according to claim 1, wherein the virtual location is one of:
an exact location that corresponds to a real-world location of the set of real-world locations in the virtual world, or
a randomized version of the real-world location.

8. The first electronic device according to claim 1, wherein the circuitry further:
controls the display device to further render a User Interface (UI) element that enables a movement of an avatar in the virtual world; and
determines a current location of the avatar in the virtual world,
wherein the virtual element is selected from the set of virtual elements based on a proximity of the current location from that of the virtual element in the virtual world.

9. The first electronic device according to claim 1, wherein each object of the set of objects is a two-dimensional (2D) or three-dimensional (3D) graphical representation that is rendered in a proximity of the virtual element.

10. The first electronic device according to claim 1, wherein the circuitry further controls the display device to further render UI elements that include at least one of descriptions of the set of objects, options to interact with the set of objects, or viewing options for pricing information associated with the set of objects, and wherein the UI elements are rendered in a proximity of the set of objects in the virtual world.

11. The first electronic device according to claim 1, wherein the set of offerings include at least one of a physical product, a service, a subscription, a virtual product, or a digital asset.

12. The first electronic device according to claim 1, wherein the circuitry further controls the display device to render an advertisement on a virtual space that is in proximity of the virtual element.

13. The first electronic device according to claim 1, wherein the circuitry is further configured to render an offer price at which the customer is interested to purchase the offering, wherein the second user input includes the approval of the seller for the purchase at the offer price.

14. A method, comprising:
in a first electronic device:
storing, by a memory, a plurality of social relationships between a customer and each of a plurality of sellers;
controlling a display device to render a virtual world with a set of virtual elements to represent a set of real-world locations of a geographical area;
selecting a virtual element from the set of virtual elements;
determining, based on the selected virtual element, a social relationship between the customer and a seller associated with the selected virtual element, wherein the customer is associated with the display device, the plurality of social relationships includes the social relationship, and
the plurality of sellers includes the seller;
determining, based on the social relationship, a virtual location in the virtual world at which an object of a set of objects is to be rendered, wherein the memory further stores the set of objects;
controlling the display device based on the selection of the virtual element to further render the set of objects inside the virtual world,
wherein the set of objects represents a set of offerings that is transactable and is available with the seller;
selecting the object of the set of objects based on a first user input, wherein the object is rendered at the virtual location in the virtual world;
controlling the display device to further render a first User Interface (UI) element in proximity of the object;
receiving, via the first UI element, a second user input to purchase an offering associated with the object;
receiving a third user input, from a second electronic device associated with the seller, that includes approval of the purchase, wherein the first electronic device is communicatively coupled to the second electronic device associated with the seller; and
executing, for the selected object, a transaction between the seller and the customer, based on the third user input.

15. The method according to claim 14, wherein the virtual world is a three-dimensional (3D) Virtual Reality (VR)

environment, and the set of virtual elements are a set of 3D virtual models of residential spaces that correspond to the set of real-world locations.

16. The method according to claim 14, wherein the virtual world is a two-dimensional (2D) Virtual Reality (VR) environment that represents the set of real-world locations via a grid-pattern or a progressive linear arrangement of the set of virtual elements, and
the set of virtual elements are virtual models of residential spaces that correspond to the set of real-world locations.

17. The method according to claim 14, further comprising detecting a location of the first electronic device,
wherein the virtual world is rendered based on the location and the set of virtual elements represents the set of real-world locations that are within a threshold distance from the location of the first electronic device.

18. The method according to claim 17, further comprising determining a distance between the location of the first electronic device in the virtual world and each real-world location of the set of real-world locations,
wherein the virtual element is selected based on:
a determination that the distance between the location of the first electronic device and a real-world location of the set of real-world locations is a minimum, and
the real-world location corresponds to the virtual element.

19. The method according to claim 14, further comprising receiving an input that includes a digital interaction with the virtual element, wherein the virtual element is selected based on the digital interaction.

20. A non-transitory computer-readable storage medium configured to store instructions that, in response to being executed, causes a first electronic device to perform operations, the operations comprising:
storing, in a memory, a plurality of social relationships between a customer and each of a plurality of sellers;
controlling a display device to render a virtual world with a set of virtual elements to represent a set of real-world locations of a geographical area;
selecting a virtual element from the set of virtual elements;
determining, based on the selected virtual element, a social relationship between the customer and a seller associated with the selected virtual element, wherein the customer is associated with the display device,
the plurality of social relationships includes the social relationship, and
the plurality of sellers includes the seller;
determining, based on the social relationship, a virtual location in the virtual world at which an object of a set of objects is to be rendered, wherein the memory further stores the set of objects;
controlling the display device based on the selection of the virtual element to further render the set of objects inside the virtual world,
wherein the set of objects represents a set of offerings that is transactable and is available with the seller;
selecting the object of the set of objects based on a first user input, wherein the object is rendered at the virtual location in the virtual world;
controlling the display device to further render a first User Interface (UI) element in proximity of the object;
receiving, via the first UI element, a second user input to purchase an offering associated with the object;
receiving a third user input, from a second electronic device associated with the seller, that includes approval of the purchase, wherein the first electronic device is communicatively coupled to the second electronic device associated with the seller; and
executing, for the selected object, a transaction between the seller and the customer, based on the third user input.

* * * * *